United States Patent [19]

Fischer

[11] Patent Number: 4,940,372
[45] Date of Patent: Jul. 10, 1990

[54] ANCHORING PLUG

[75] Inventor: Artur Fischer, Waldachtal, Fed. Rep. of Germany

[73] Assignee: fischerwerke Artur Fischer GmbH & Co. KG, Waldachtal, Fed. Rep. of Germany

[21] Appl. No.: 155,318

[22] Filed: Feb. 12, 1988

[30] Foreign Application Priority Data

Feb. 21, 1987 [DE] Fed. Rep. of Germany ....... 3705654
Jun. 6, 1987 [DE] Fed. Rep. of Germany ....... 3719034

[51] Int. Cl.⁵ ............................................. F16B 13/06
[52] U.S. Cl. ...................................... 411/32; 411/55; 411/60
[58] Field of Search ...................... 411/32, 49, 50, 57, 411/53, 55, 60, 61

[56] References Cited

U.S. PATENT DOCUMENTS

| 2,625,071 | 1/1953 | Lewis | 411/53 |
| 3,922,831 | 12/1975 | Fischer | 411/55 X |
| 3,967,525 | 7/1976 | Lerich | 411/69 |
| 4,484,848 | 11/1984 | Ott | 411/49 X |
| 4,640,654 | 2/1987 | Fischer et al. | 411/55 |

FOREIGN PATENT DOCUMENTS

| 223908 | 12/1957 | Australia | 411/55 |
| 211100 | 2/1987 | European Pat. Off. | 411/34 |
| 2401243 | 7/1975 | Fed. Rep. of Germany | 411/55 |
| 1179556 | 12/1958 | France | 411/55 |
| 1592228 | 5/1970 | France | 411/55 |
| 39459 | 4/1957 | Poland | 411/55 |
| 904899 | 9/1962 | United Kingdom | 411/53 |
| 1309391 | 3/1973 | United Kingdom | 411/55 |
| 2094919 | 9/1982 | United Kingdom | 411/57 |

Primary Examiner—Neill R. Wilson
Attorney, Agent, or Firm—Michael J. Striker

[57] ABSTRACT

An anchoring plug for anchoring objects to a support structure includes an expansible sleeve, an expander body driven into the expansible sleeve and a screw for driving the expander body into the expansible sleeve. A ring-shaped spring member, which forms a bearing for the expansible sleeve, is positioned at the trailing end of the expansible sleeve. The spring member has the external diameter greater than that of the expansible sleeve and, may due to its properties be compressed to the external diameter of the expansible sleeve.

1 Claim, 3 Drawing Sheets

ANCHORING PLUG

BACKGROUND OF THE INVENTION

The present invention relates to a plug to be anchored in a bore drilled in a support structure.

Anchoring plugs of the type under consideration include an expansible sleeve insertable into the bore of the support structure; an expander body driven into the expansible sleeve by a screw and a bearing member, on which the expansible sleeve is supported and which can be formed, for example by a spacer sleeve. The latter normally lies against a counter bearing of the screw. The counter bearing can be formed by the head of the screw or by a packing washer.

When a spacer sleeve is used as a bearing element an additional sleeve of plastic can be required between the expansible sleeve and the spacer sleeve. The additional sleeve then forms a zone which bulges when compressed so as to ensure that the plug is reliably clamped with an object being fastened to the support structure.

Plugs of another type are also known, which are provided with an expansible sleeve which firmly plugs into the bore drilled in the support structure as the expander body is inserted into the expansible sleeve while the expansible sleeve does not lie against the bearing element.

The use of such anchoring plugs in a tension zone of the anchoring plate requires that the plug would have a considerable expansion quality, in order, as the drill hole enlarges as a result of crack forming, to avoid a reduction in the holding capacity of the plug. Due to he friction acting between the expansible sleeve and the expander body, after the plug has been anchored in the drill hole, in the worst cases, where the drill hole enlarges as a result of cracks formed due to the load acting on the expander body, the expansible sleeve, and therewith the entire plug, can be pulled out of the drill hole, without the enlargement of the drill hole, which is compensated by a further expansion of the plug.

SUMMARY OF THE INVENTION

It is an object of the present invention to provide an improved anchoring plug.

It is another object of the present invention to improve the ability of the plug of the foregoing type to expand subsequently to such an extent that the plug would be able to compensate for an enlargement of the drill hole resulting from the formation of cracks by the expander body when the latter slips further into the expansible sleeve.

These and other objects of the invention are attained by an anchoring plug for fastening objects to a support structure, comprising an expansible sleeve formed with a plurality of longitudinal slots at a leading end thereof, insertable into a hole drilled in the support structure, an expander body driven into said expansible sleeve to expand and clamp the latter in said hole, a screw connected to said expander body for driving said expander body into said expansible sleeve, and a bearing means against which said expansible sleeve is supported as said expander body is inserted into said expansible sleeve, said bearing means being formed by a ring-shaped spring member which has an external diameter which is greater than an external diameter of said expandible sleeve and which can be compressed to said external diameter of said expansible sleeve.

Upon the insertion of the plug according to the invention into a hole drilled in the anchoring support, the ring-shaped spring member is compressed to the diameter of the drill hole corresponding at least to the external diameter of the expansible sleeve. No appreciable additional force is required to drive the plug into the drill hole. Once the plug has been inserted, by turning the screw, the expander body is moved in an axial direction and is pulled into the expansible sleeve to anchor this in the drill hole. In the course of this, the expansible sleeve is able to clamp itself directly or indirectly against the ring-shaped spring member, as the ring-shaped spring member is firmly clamped against the wall of the drill hole. As the expansible sleeve expands, the ring-shaped spring member is also able to support itself through a counter bearing on the screw head.

The counter bearing means may include a means defining an annular surface, said ring-shaped member lying at a side thereof, remote from said expansible sleeve, on said means defining an annular surface.

The plug may include a spacer sleeve positioned on said screw and forming said means defining an annular surface of the counter bearing means.

The plug may include a threaded element connected to said screw and forming said means defining an annular surface of the counter bearing means.

The screw may have a step forming said means defining an annular surface of the counter bearing means.

If the drill hole enlarges as a result of the formation of cracks the ring-shaped spring member is able to accommodate this enlarging of the drill hole and to clamp the expansible sleeve against an axial movement thereof. The inevitable result is that the load acting on the expander body overcomes friction between the expander body and the expansible sleeve and draws the expander body into the expansible sleeve. As a result of the increased expansion of the expansible sleeve associated therewith, the enlargement of the drill hole due to cracks would be counterbalanced.

With its side, remote from the expansible sleeve, the ring-shaped spring member may lie against an annular surface which is formed on the plug or by the fore end of a screw-on element or a spacer sleeve. As the plug is driven into the drill hole, the ring-shaped spring member is supported against this annular surface.

To ensure that the ring-shaped spring member is centered before and during insertion, an annular projection, which is complementary to the cross-section of the ring-shaped spring member may be formed on an annular surface adjacent the ring-shaped spring member. The ring-shaped spring member is not only centered by but it also rests on said projection. As the ring-shaped spring member is compressed this annular projection additionally causes the ring-shaped spring member to exert an axial force on the expansible sleeve whereby the expansion is promoted.

If the plug has a spacer sleeve arranged between the screw head and the ring-shaped spring member, which forms the counter bearing for the expansible sleeve, then a zone, which bulges when compressed, can be arranged adjacent the ring-shaped spring member.

The ring-shaped spring member may be arranged either between the spacer sleeve and the plastic sleeve forming the zone which bulges when compressed, or between the plastic sleeve and the expansible sleeve. In the latter embodiment, an advantageous design is when the expansible sleeve has a stepped portion engaging over a part of its length in the plastic sleeve while the ring-shaped spring member extends over this portion.

As the plug is driven into the drill bore in the anchoring support structure, the ring-shaped spring member projecting beyond the external diameter of the expansible sleeve is compressed to the diameter of the drill bore. Since, in the preparation of a bore, a funnel-shaped enlargement generally appears as the mouth of the bore owing to the anchoring support structure flaking away, it is possible to drive in the plug with the projecting ring-shaped spring member without any great difficulty. However, in the case of the sharp-edged bores having no funnel portion at the mouth thereof, the ring-shaped spring member may present resistance to the plug being driven in, so that stronger hammer blows would be required to overcome this, entailing the risk of damage to the plug.

To enable the plug to be driven in easily even when the drill holes are not broken away, a ring-shaped spring member can be accommodated in the expansible sleeve. An annular enlargement can be formed in the expansible sleeve. Only the end of the expansible sleeve, remote from the expander body, is then expanded beyond the diameter of the drill hole, while the other end of the expansible sleeve has a somewhat smaller external diameter than the diameter of the drill hole. As a result, the external surface of the expansible sleeve forms a sloping face which, while presenting little resistance to driving in of the plug, allows the expansible sleeve to be compressed to the diameter of the drill hole. Once the plug has been inserted, by turning the screw, the expander body is moved in an axial direction and is pulled into the expansible sleeve to anchor the same in the drill hole. If the drill hole becomes enlarged as a result of the crack formation, the one end of the expansible sleeve is able to accommodate this enlarging of the drill hole by means of the resilient ring-shaped spring member, and firmly clamp itself in the drill hole. The inevitable result is that the load acting on the expander body overcomes friction between the expander body and the expansible sleeve and draws the expander body into the expansible sleeve.

This subsequent slipping of the expander body and the increased expansion of the expansible sleeve associated therewith compensates for the enlargement of the drill hole.

The enlargement at its end which is remote from said expander body may overlap said spring member. The ring-shaped spring member is in this manner secured against falling out of the annular enlargement of the internal bore of the expansible sleeve.

The spring member may have a gap which is aligned with an additional continuous slot of the expansible sleeve. An optional use of the radial force of the ring-shaped spring member to expand the expansible sleeve is achieved by this configuration.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
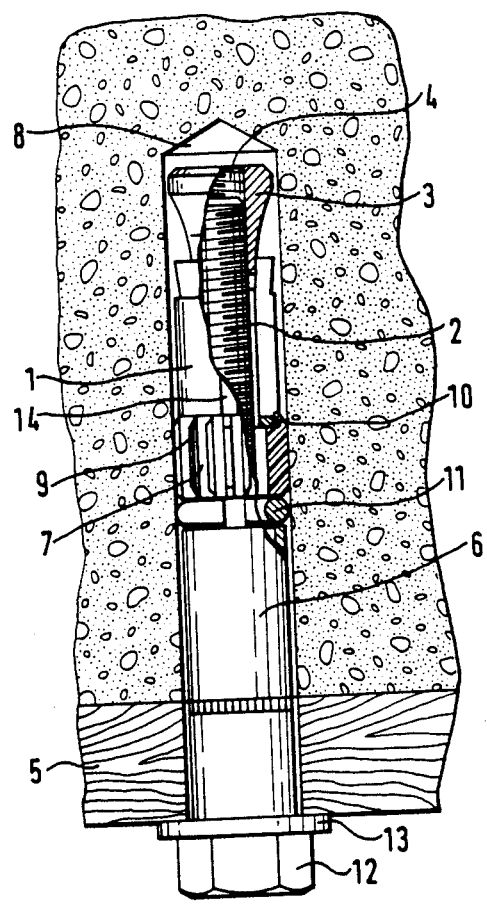
FIG. 1 is a partial sectional elevation view of the plug inserted into a drilled hole of the support structure, according to the invention.

Referring now to the drawings in detail, and firstly to FIG. 1 thereof, it will be seen that an anchoring plug includes an expansible sleeve 1 extending over a part of its length which has a leading end portion provided with longitudinal slots 14 so that expansible leg portions are produced in the known fashion. The plug further comprises an expander body 3 which is insertable into expansible sleeve 2 by means of a screw 2 whereby the leading end portion of sleeve 2 expands in a drilled bore hole 8.

The expander body 3 has an internal thread 4 into which the corresponding thread of screw 2 is screwed.

In order to bridge voids, when an article 5 to be fastened is clamped, between the expansible sleeve 1 and the space sleeve 6 there is arranged a plastic sleeve 7 which serves as zone which bulges when compressed. The plastic sleeve 7 has external longitudinal ribs 9, and by the association thereof with the expansible sleeve 1, sleeve 7 is clamped in the bore hole 8 so that sleeve 7 simultaneously serves as a means for preventing the expansible sleeve 1 from a joint rotation with screw 2. To join the expansible sleeve 1 to the plastic sleeve 7, the expansible sleeve has a stepped portion 10 which engages in the internal bore of the plastics sleeve 7.

Between the spacer sleeve 6 and the plastic sleeve 7, is positioned a ring-shaped spring member 11, the external diameter of which is greater than the diameter of the expansible sleeve 6. For a plug of up to 12 mm drill hole diameter, an overdimension of the diameter of the ring-shaped spring member 11 of about 1 mm is advantageous, and for larger diameters of drill holes, an overdimension of this diameter up to about 1.5 mm is advantageous.

Since the ring-shaped spring member 11 is oversized, this spring member firmly presses against the peripheral wall of the drill hole 8 once the plug has been driven into the drill hole. A screw head 12, which is supported by a washer 13 at the outer face of an article 5 to be fastened, serves as a counter bearing for the clamping of the article 5 to be fastened and for pulling the expander body 3 into sleeve 1. By applying a torque to the screw head 12, the expander body 3 is drawn into the expansible sleeve 1. The expansible leg portions of the expansible sleeve 1 formed by the longitudinal slots 14 are pressed radially into the wall of the drill hole. If the drill hole 8 enlarges as a result of cracks formed therein, then the ring-shaped spring member 11, pressed against the wall of the drill hole 8, prevents an axial displacement of the expansible sleeve 1. The expander body 3 is thereby inevitably drawn further into the expansible sleeve 1 so that the enlarging of the drill hole is counterbalanced by the additional expansion of the expansible sleeve 1.

Figure 2:
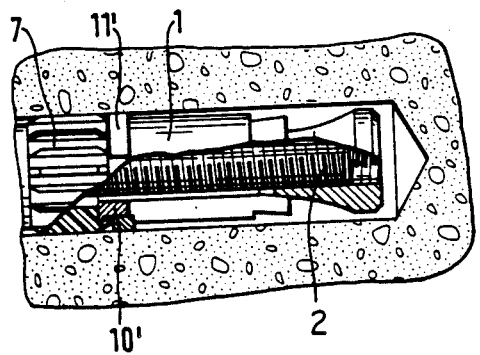
FIG. 2 is a partial sectional view of another embodiment of the invention.

In the embodiment of FIG. 2, the ring-shaped spring member 11 positioned between the expansible sleeve 1 and the plastic sleeve 7 sits on a stepped, extended portion 10' of the expansible sleeve 1 which engages in the plastic sleeve 7. Since this embodiment requires a relatively small thickness of the wire of the ring-shaped spring member 11', it is advisable to use a ring-shaped spring member manufactured from a wire of rectangular cross-section.

Figure 3:
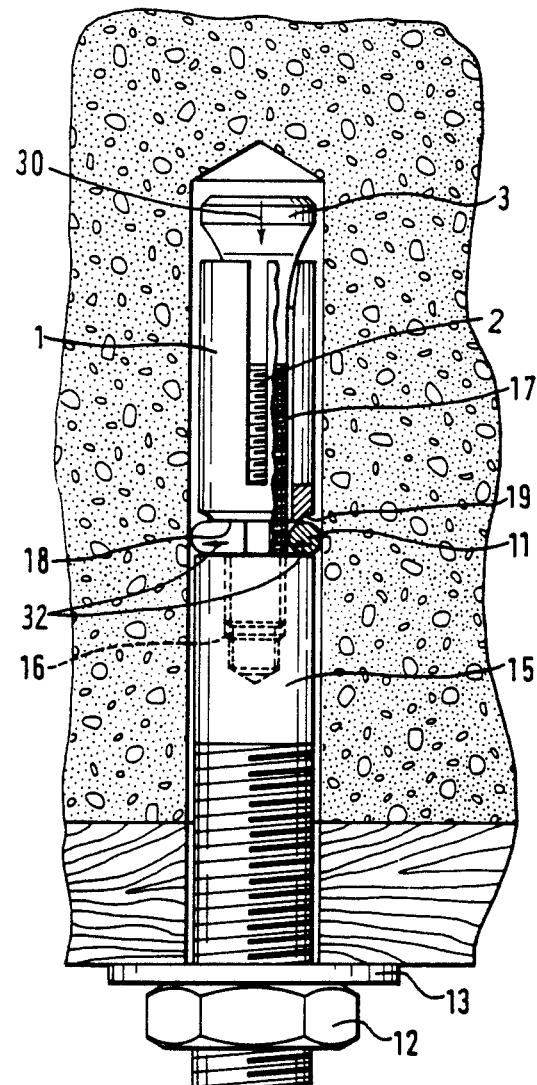
FIG. 3 is a partial sectional view of yet another embodiment of the anchoring plug.
Figure 3A:
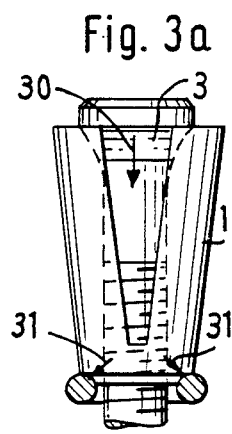
FIG. 3a is a view showing the inventive plug during anchoring.

FIG. 3 illustrates a further embodiment, in which the ring-shaped spring member 11 is positioned between the expansible sleeve 1 and a threaded bolt 15. The threaded bolt 15 is connected to the expander body 3 by a threaded portion 17 engaging in a threaded bore 16 of the threaded bolt 15. With relatively small plug diameters, the expander body 3 may be formed integrally with the threaded bolt 15. The fore end 18 of the expander sleeve 1 is formed with a projection which has an annular surface 19, formed in correspondence with the cross-sectional shape of the ring-shaped spring member 11 so as to center the ring-shaped spring member 11 before and during assembly. In addition, this annular surface 19 promotes the expansion process. When the expander body 3 is pulled in the direction of the arrow 30 into the expansible sleeve 1, the expansible sleeve 1 presses with its annular surface 19 inwardly against the spring ring 11. The forces applied by the annular surface 19 to the spring ring 11 are identified with the arrow 31 in FIG. 3a. Thereby the spring ring 11 is additionally pressed outwardly so that it not only presses with its radial spring force 32 against the peripheral wall of the hole but also additionally is expanded by the expansible sleeve 1 with its annular surface 19 and is pressed especially strongly against the peripheral wall of the hole. The annular surface 19 has a special function, namely to ensure that the spring ring 11 is firmly clamped in the hold and therefore forms a firm abutment for the expansible sleeve 1.

Figure 4:
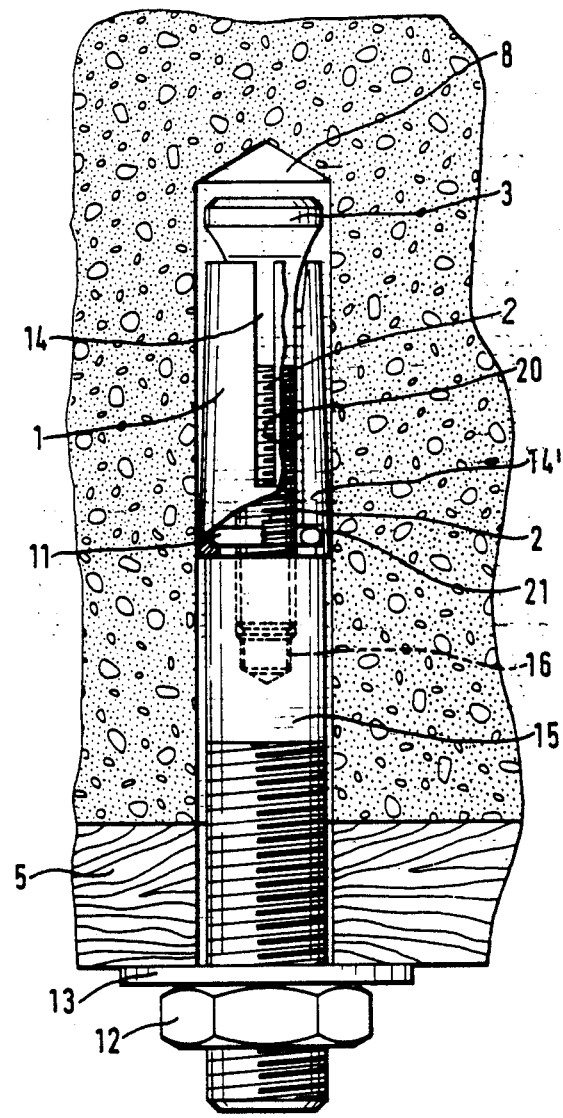
FIG. 4 is a partial sectional view of a still further embodiment of the anchoring plug of this invention.

The plug embodiment shown in FIG. 4 includes the expansible sleeve 1, which is formed with spaced longitudinal slots 14 starting from its insertion end and extending along a part of its length. In addition, sleeve 1 has at least one continuous slot 14'. The expander body 3 is insertable into sleeve 1 by means of screw 2 for the expansion thereof. The expander body 3 is joined to the screw 2 to form a unitary piece. Screw 2 in turn engages in the threaded bore 16 of the threaded bolt 15 for connection thereto. An internal bore 20 of the expansible sleeve 1 is provided at its end, remote from the expander body, with an annular enlargement 21 into which the ring-shaped spring member 11 is inserted. By means of the ring-shaped spring member 11, this end of the expansible sleeve 1 is expanded to a diameter projecting beyond the external diameter of the plug. Inasmuch as this end of the expansible sleeve 1 is oversized, sleeve 1 firmly presses into the wall of the drill hole 8 once the plug has been driven into the drill hole. The nut 12, which is supported by the supporting washer 13 at the outer surface of the article 5 to be fastened, serves as a counter bearing for clamping the article to be fastened, and for drawing in the expander body 3 into sleeve 1. By applying a torque to the nut 12, the expander body 3 is drawn into the expansible sleeve 1. The expansible leg portion of the expansible sleeve 1 formed by the longitudinal slots 14 are simultaneously pressed radially into the wall of the drill hole 8.

If, after anchoring, the drill hole 8 enlarges as a result of formed cracks the end of the expansible sleeve 1 firmly clamped by the ring-shaped spring member 11 against the wall of the drill hole 8 prevents an axial displacement of the expansible sleeve 1. Further insertion of the expander body 3 into the expansible sleeve 1 is thereby inevitably the outcome, so that the additional expansion of the expansible sleeve 1 compensates for the enlarging of the drill hole 8.

To ensure the position of the ring-shaped spring member 11 in the annular enlargement 21 of the expansible sleeve 1, the fore end of the enlargement 21 overlaps a part of the profile of the ring-shaped spring member 11. Furthermore, the ring-shaped spring member 11 is positioned in the enlargement 21 for an optional use of the expansive force of the ring-shaped spring member 11 in such a manner that a gap or break provided in the ring-shaped spring member 11 is aligned with the continuous slot 14 of the expansible sleeve 1.

It will be understood that each of the elements described above, or two or more together, may also find a useful application in other types of anchoring plugs differing from the types described above.

While the invention has been illustrated and described as embodied in an anchoring plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An anchoring plug for fastening objects to a support structure, comprising an expansible sleeve formed with a plurality of longitudinal slots at a leading end thereof, insertable into a hole drilled in the support structure, an expander body driven into said expansible sleeve to expand and clamp the latter in said hole, a screw connected to said expander body for driving said expander body into said expansible sleeve, and a bearing means against which said expansible sleeve is supported as said expander body is inserted into said expansible sleeve, said bearing means including a ring-shaped spring member and having an external diameter which is greater than an external diameter of said expansible sleeve, said bearing means being compressible in the hole of the support structure to said external diameter of said expansible sleeve to be pressed radially against a peripheral wall of the hole so as to support said expansible sleeve, and means for centering said ring-shaped spring member before and during assembly and promoting an expansion process and including a projection formed on said expansible sleeve and provided with an annular surface corresponding in shape to a cross-section of said ring shaped spring member so as to laterally press said ring-shaped spring member from inside radially outwardly against the peripheral wall of the hole during expansion of said expansible sleeve.

* * * * *